United States Patent
Ding et al.

(10) Patent No.: US 9,405,587 B2
(45) Date of Patent: *Aug. 2, 2016

(54) AUTOMATED CAPACITY PROVISIONING METHOD USING HISTORICAL PERFORMANCE DATA

(71) Applicant: BMC SOFTWARE, INC., Houston, TX (US)

(72) Inventors: Yiping Ding, Dover, MA (US); Assaf Marron, Ramat-Gan (IL); Fred Johannessen, Leander, TX (US)

(73) Assignee: BMC SOFTWARE, INC., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/743,161

(22) Filed: Jun. 18, 2015

(65) Prior Publication Data

US 2015/0309840 A1    Oct. 29, 2015

Related U.S. Application Data

(63) Continuation of application No. 14/044,614, filed on Oct. 2, 2013, now Pat. No. 9,065,783, which is a continuation of application No. 11/848,298, filed on Aug. 31, 2007, now Pat. No. 8,555,287.

(60) Provisional application No. 60/824,240, filed on Aug. 31, 2006.

(51) Int. Cl.
*G06F 9/46* (2006.01)
*G06F 9/50* (2006.01)
*H04L 12/911* (2013.01)
*G06F 3/0484* (2013.01)

(52) U.S. Cl.
CPC .............. *G06F 9/505* (2013.01); *G06F 3/0484* (2013.01); *H04L 47/823* (2013.01); *G06F 2209/508* (2013.01); *G06F 2209/5019* (2013.01)

(58) Field of Classification Search
None
See application file for complete search history.

(56) References Cited

U.S. PATENT DOCUMENTS 8,555,287 B2   10/2013   Ding et al.
9,065,783 B2    6/2015   Ding et al.
(Continued)

OTHER PUBLICATIONS

Non-Final Office Action received for U.S. Appl. No. 11/848,298, mailed on Mar. 2, 2011, 19 pages.
(Continued)

*Primary Examiner* — Sisley Kim
(74) *Attorney, Agent, or Firm* — Brake Hughes Bellermann LLP

(57) ABSTRACT

The method may include collecting performance data relating to processing nodes of a computer system which provide services via one or more applications, analyzing the performance data to generate an operational profile characterizing resource usage of the processing nodes, receiving a set of attributes characterizing expected performance goals in which the services are expected to be provided, and generating at least one provisioning policy based on an analysis of the operational profile in conjunction with the set of attributes. The at least one provisioning policy may specify a condition for re-allocating resources associated with at least one processing node in a manner that satisfies the performance goals of the set of attributes. The method may further include re-allocating, during runtime, the resources associated with the at least one processing node when the condition of the at least one provisioning policy is determined as satisfied.

15 Claims, 7 Drawing Sheets

(56) References Cited

U.S. PATENT DOCUMENTS

| | | | |
|---|---|---|---|
| 2002/0069279 A1 | 6/2002 | Romero et al. | |
| 2003/0233391 A1* | 12/2003 | Crawford, Jr. | G06F 9/505 718/104 |
| 2004/0111509 A1* | 6/2004 | Eilam | H04L 67/1008 709/224 |
| 2004/0133395 A1 | 7/2004 | Ding et al. | |
| 2004/0181794 A1* | 9/2004 | Coleman | G06F 11/008 718/104 |
| 2004/0267897 A1* | 12/2004 | Hill | G06F 9/505 709/217 |
| 2005/0160133 A1* | 7/2005 | Greenlee | G06F 9/505 709/200 |
| 2006/0230149 A1* | 10/2006 | Jackson | G06F 9/5027 709/226 |
| 2007/0271570 A1 | 11/2007 | Brown et al. | |
| 2014/0032768 A1 | 1/2014 | Ding et al. | |

OTHER PUBLICATIONS

Response to Final Office Action received for U.S. Appl. No. 11/848,298, filed on Jun. 30, 2011, 10 pages.
Final Office Action received for U.S. Appl. No. 11/848,298, mailed on Aug. 3, 2011, 19 pages.
Advisory Action received for U.S. Appl. No. 11/848,298, mailed on Oct. 27, 2011, 3 pages.
Notice of Allowance received for U.S. Appl. No. 11/848,298, mailed on Jun. 7, 2013, 20 pages.
Non-Final Office Action received for U.S. Appl. No. 14/044,614, mailed on Apr. 1, 2014, 37 pages.
Response to Non-Final Office Action for U.S. Appl. No. 14/044,614, filed on Jul. 1, 2014, 8 pages.
Final Office Action received for U.S. Appl. No. 14/044,614, mailed on Sep. 11, 2014, 20 pages.
Response to Final Office Action received for U.S. Appl. No. 14/044,614, filed on Dec. 11, 2014, 9 pages.
Notice of Allowance received for U.S. Appl. No. 14/044,614, mailed on Feb. 18, 2015, 11 pages.
"BMC Performance Assurance Suite for Servers: Product Suite Datasheet—BMC Performance Analyzer for Servers: Get Interactive, Self-Service Insight Into Your Past, Present and Future Application Server Performance", BMC Software, Inc., 2005, 4 pages.
"BMC Performance Assurance Suite for Servers: Product Suite Datasheet—BMC Performance for Servers: Accurately Measure, Manage and Improve System and Application Performance", BMC Software, Inc., 2005, 4 pages.
"BMC Performance Assurance Suite for Servers: Product Suite Datasheet—BMC Performance Perceiver for Servers: Enhance Decision-Making Capabilities Through Direct, Dynamic Access to Relevant Performance Data", BMC Software, Inc., 2005, 2 pages.
"Solution Whitepaper—Capacity Management and the CDB: BMC Solutions as the Cornerstone to a Capacity Management Strategy", BMC Software, Inc., Feb. 16, 2007, 12 pages.

\* cited by examiner

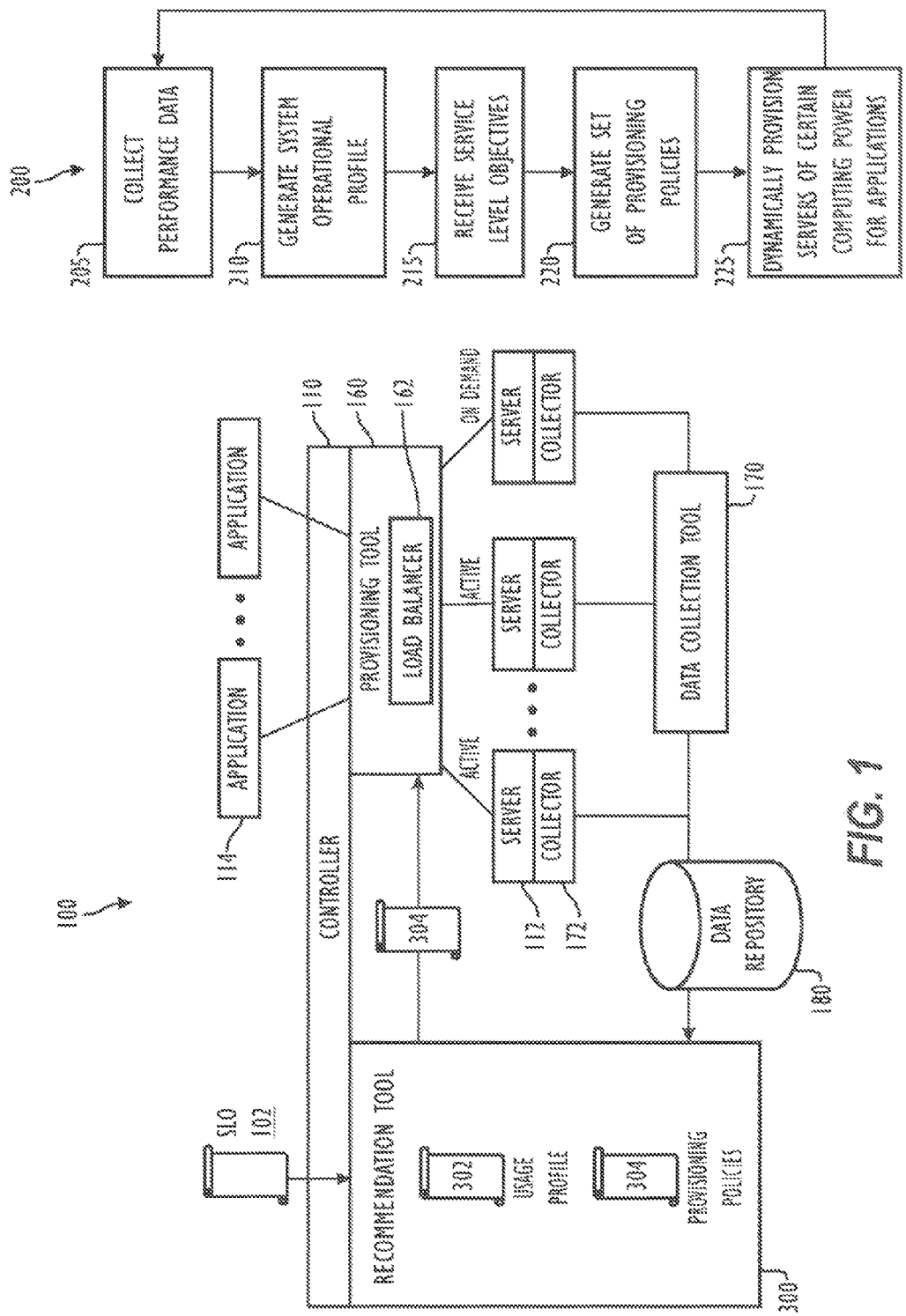

AUTOMATED CAPACITY PROVISIONING METHOD USING HISTORICAL PERFORMANCE DATA

CROSS-REFERENCE TO RELATED APPLICATIONS

This application is a continuation of, and claims priority to, U.S. patent application Ser. No. 11/848,298, filed on Aug. 31, 2007, which claims priority to non-provisional U.S. Patent Application No. 60/824,240 filed Aug. 31, 2006, both of which are incorporated herein by reference in their entirety.

FIELD OF THE DISCLOSURE

The subject matter of the present disclosure relates to a system and method for automatically provisioning the capacity of a computer system.

BACKGROUND OF THE DISCLOSURE

Capacity planning tools can be used to plan the capacity of a computer system and manage its performance. To do this, capacity planning tools focus on (1) identifying performance bottlenecks in the computer system and (2) providing "what-if" functionalities that can be used to evaluate performance implications of different hardware configurations of that system. Other tools referred to as system provisioning tools can be used to provision the computer system with the goal of setting up a configuration that is cost effective from a business perspective. To effectively achieve this goal, provisioning tools need intelligent input to determine what and how many servers and other system components are needed to satisfy the service level objectives (SLOs) of the computer system.

Unfortunately, prior art capacity planning tools do not provide direct input to provisioning tools, nor do they receive any direct feedback from the provisioned computer system that could be used to validate or adjust the system's configuration. Instead, users have to translate performance information, such as reports and graphs, into system recommendations and then input those recommendations into the provisioning tool for execution because direct output from the prior art capacity planning tool would not be usable by the prior art provisioning tool. Due to these problems, prior art provisioning tools provision a computer system based merely on user-inputted rules or on rule of thumb. Moreover, prior art provisioning tools rely on policies that are static and that may or may not reflect historical demands of the computer system for resources. In short, prior art provisioning tools do not take provisioning actions on potential computing needs based on historic resource usage patterns. They are purely reactive rather than proactive.

SUMMARY OF THE DISCLOSURE

In accordance with one embodiment, an automated system manages and provisions a computer system, which can be a physical or virtual enterprise system. During operation, the automated system obtains performance data pertaining to the computer system's processing nodes (e.g., servers), which are partitioned into partitions. Performance data can include. Inter alia, a performance rating and measured utilization values for each of the computer system's processing nodes. Performance data can also include measurements of actual service levels, such as response times, workloads, throughputs (units of work per unit of time), etc.

From the performance data related to performance rating and utilization values, for example, the automated system normalizes a utilization value for each of the processing nodes over a period of time and generates a weighted average for each utilization value. Also during operation, the automated system receives service level objectives (SLO) for the computer system and automatically determines provisioning policies based on these SLOs. For example, automated system can automatically determined provisioning policies using the received SLOs and the weighted average normalized utilization values determined from the performance data automatically determines provisioning policies. In such an example, the provisioning policies can thereby indicate desired outcome service level information, such as a number of processing nodes required to meet the SLOs, an arrival value (e.g., throughput) for transactions to each of the processing nodes, and a potential service level for each of the processing nodes.

Based on the provisioning policies, the automated system automatically provisions at least some of the processing nodes across the partitions to load balance the system's capacity. As used herein, provisioning the processing nodes by the automated system can include such actions as sending, routing, directing, or distributing system transactions to the processing nodes (e.g., servers) and such actions as installing (removing) or activating (deactivating) processing nodes (e.g., servers) to process transactions. With the automatically generated policies and provisioning, the automated system is both proactive and reactive. Its proactive aspect generates policies based on analysis of current and historical information, and its reactive aspect analyzes current and historical information and reacts accordingly using the generated policies.

BRIEF DESCRIPTION OF THE DRAWINGS

FIG. 1 illustrates one embodiment of an automated capacity provisioning system.

FIG. 2A illustrates one embodiment of an automated capacity provisioning process for the system of FIG. 1.

DETAILED DESCRIPTION

Figure 2B:
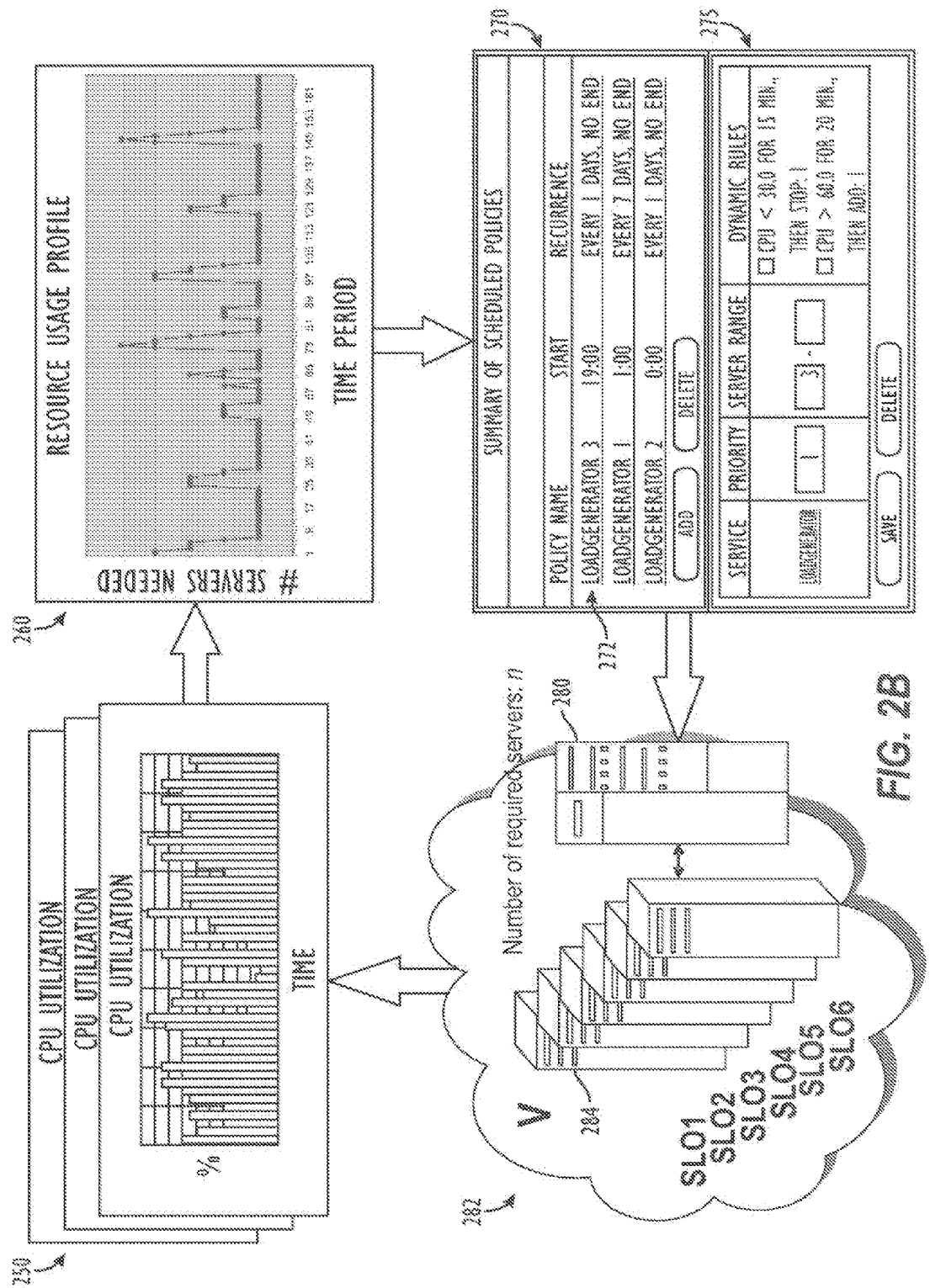
FIG. 2B illustrates elements associated with the process of FIG. 2A.

FIG. 1 illustrates one embodiment of an automated capacity provisioning system for a computer system 100. The provisioning system includes a recommendation tool 300, a provisioning tool 160, a data collection tool 170, and a data repository 180. In general, computer system 100 can be a network system, an enterprise system, or the like and can include various system components, such as workstations, computer servers, applications, storage devices, network connections, and other conventional components. For the sake of illustration, computer system 100 is schematically illustrated in FIG. 1 as having a controller 110 relative to a plurality of servers 112 and applications 114. Controller 110 can comprise one or more servers or other computing devices and can execute one or more of recommendation tool 300, provisioning tool 160, and data collection tool 170.

As discussed below, recommendation tool 300 automatically provides provisioning policies 304 to automatically manage and provision the computer system 100. In general, recommendation tool 300 can be a standalone software tool implemented and deployed as a Web Service capable of operating in conjunction with other tools. In addition, recommendation tool 300 can function automatically, implying that it does not rely on user intervention via a user interface. Preferably, an Application Programming Interface (API) allows recommendation tool 300 to use scripts and command line instructions to automate the run-time operation of the tool.

Provisioning tool 160 receives the provisioning policies 304 from recommendation tool 300 and automatically provisions the computer system 100 accordingly. Provisioning tool 160 is capable of physically and/or logically provisioning system components into nodes of a physical or virtual system. For a virtual system, provisioning tool 160 can add a virtual layer to the computer system 100 using virtualization features. As will be appreciated, provisioning the computer system 100 as a virtual system requires that the system hardware (e.g., servers, applications, etc.) have sufficient processing power to support a specified number of virtual partitions (not shown). In addition, each virtual partition requires its own or shared operating system and applications that run on the operating system.

The data collection tool 170 collects performance data about system components from data collectors 172 distributed throughout computer system 100. For example, the data collectors 172 can be monitoring agents to collect performance data about processing nodes (e.g., servers 112) and provide the collected performance data to the data collection tool 170. In turn, a data repository 180 stores the collected data for use by recommendation tool 300. Data repository 180 can be any database, data source, or file system known in the art for storing the collected data. Ultimately, recommendation tool 300 in conjunction with the provisioning tool 160 and data collection tool 170 manages the computer system's capacity using an automated capacity provisioning process, such as discussed below with reference to FIG. 2A.

As shown in automated process 200 of FIG. 2A, data collectors 172 collect performance data of computer system 100, and data collection tool (170) stores the performance data in data repository 180 (Block 205). The performance data can include various metrics known and used in the art. As an example, BMC® Performance Manager or BMC® Performance Assurance Suite for Servers can be used to collect performance data and store it in a database or a file system. Other data collection tools can also be used, as long as the data is stored or can be retrieved in a predefined common format, such as CSV, ASCII, XML, or through a predefined API (Application Programming Interface).

With the performance data collected, recommendation tool 300 analyzes the collected data and generates a system operational profile 302 (Block 210). In one embodiment, operational profile 302 can characterize resource usage of computer system 100 or partitions thereof over one or more time periods. In alternative embodiments, operational profile 302 can characterize service levels in computer system 100. Such service levels can represent response times of servers when subjected to given workloads or can represent the ability of servers to process given workloads or throughputs. In creating operational profile 302, recommendation tool 300 may focus on the collected data from system components, such as server processors and CPUs, and on fixed attachments, such as cache, memory, and onboard disks, as well as service level information above.

During the normal course of operation, recommendation tool 300 also receives a set of Service Level Objectives (SLOs) 102 (Block 215). The SLOs 102 can come from any conventional source in computer system (100), such as from controller 110. In addition, the SLOs 102 can be received or obtained from a workload manager, computing device, or other source having management and compliance information for one or more Service Level Objectives (SLO) or Service Level Agreements (SLA). As is known in the art, an SLA defines static and dynamic attributes that the system's services must satisfy between a consumer and a provider. The SLAs dynamic attributes relate to variables that may change in real-time and may depend on how the services are actually performing. Some examples of attributes include response times for transactions, expected time to finish tasks, SLA violation rates of a service, reliability of a service, availability of a service, etc. As is also known in the art, an SLO defines specific attributes of a given service associated with an SLA.

Based on the operational profile 302 and the received SLOs 102, recommendation tool 300 generates a set of provisioning policies 304 for use in provisioning the computer system's resources (Block 220). Depending on the implementation, these provisioning policies 304 can be used to directly provision the computer system 100 or can be used at times when certain total workloads are expected, when such workloads are encountered in practice, or when certain performance characteristics are encountered. Preferably, the generated provisioning policies 304 factor in performance of the system components over a period of time that is long enough to account for variances in business cycles.

In general, the generated provisioning policies 304 define plans of action for guiding provisioning decisions to produce desired outcomes. The plans of action can be characterized as one or more statements, a set or collection of rules, and/or a set of "if . . . then, . . . else . . . " predicates. For example, a given SLA may state that business application response time must be less than 1 second 95% of the time. To achieve this, analysis of the historical performance data is used to identify resource usage patterns for (near future) resource provisioning and allocation. Furthermore, the analysis can be used to generate provisioning policies 304 as a developed set of rules or the like to implement desired outcomes based on predictive analysis and what-if scenarios. The policies 304 can then be used to provision the computer system's resources in terms of what, how, and when available servers 112 and/or other resources are needed to support applications 114 associated with the various SLOs 102.

To generate policies, recommendation tool 300 can use time-dependent information, utilization levels, response times, transaction arrival rates, and other resource usage information. Additionally, recommendation tool 300 can use trending analysis, predictive analysis, what-if scenarios, and user input to the resource usage information to generate the policies. For example, recommendation tool 300 can use trending analysis of predicted resource requirements to generate policies that match current/past application performance. Moreover, to generate policies, recommendation tool 300 can perform predictive analysis on application performance requirements and can use "what-if" scenarios and user input.

As it operates, recommendation tool 300 can continually and automatically generate the policies (and modify existing policies) based on the historical and current information that has been collected and analyzed. In turn, the generated policies can provide different levels of reactivity and proactivity for provisioning computer system 100. For example, one type of policy can correlate time-dependent information (such as historical resource utilization) and needed servers and can state, for example, "every Monday at 7:55 AM allocate x serves." Another type of policy can correlate utilization and needed servers and can state, for example, "if the average utilization of the servers is more than x % then allocate y additional servers with performance rating z." Yet another type of policy can correlate response time and needed servers and can state, for example, "if and when average response time for transactions is measured over x minutes to be more than y seconds and existing server utilization is more than z %, then immediately allocate n additional servers then and there." Another type of policy can correlate arrival rate and needed servers and can state, for example, "as soon as transaction arrival rate exceeds x transactions per minute for more than y minutes, allocate z additional servers.

Once generated, provisioning policies 304 can be used for look up by provisioning tool 160 when determining provisioning actions to perform to computer system 100. Alternatively, recommendation tool 300 can send the policy rules as provisioning decisions to provisioning tool 160 to be acted on directly. In the end, provisioning policies 304 may result in an indication of candidate servers 112 and other resources that can be repurposed or that can be physically or virtually consolidated to handle various applications and tasks. Besides focusing on servers 112, recommendation tool 300 may also take into consideration other features of a computer system 100, such as network connections and detached storage devices to ensure overall system performance.

Using the generated provisioning policies 304, provisioning tool 160 dynamically provisions a proper number of servers 112 of a certain computing power (or other resources) when needed so that the provisioned result ensures that the requirements of the received SLOs 102 are met (Block 225). As an example, the Run Book Automation software from RealOps or a product similar to the previously available BMC® Virtualizer for Capacity on Demand product can be used for dynamic provisioning based on the generated provisioning policies. Alternatively, provisioning mechanisms in VMware® can be used.

As shown in FIG. 2A, the automated process 200 of Blocks 205 through 225 can be implemented as an ongoing process so that collecting and analyzing performance data (including resource utilization, workload, and service levels), generating policies 304, and executing those policies 304 can be repeated as needed. The process 200 can also monitor and modify its performance as it continues. In this way, the process 200 can update policies 304 and validate SLOs 102 on a continuous basis. If the probability of meeting a given SLO 102 is below a certain level, for example, a policy 304 generated at Block 220 may need to be updated using more recently collected performance data from data repository 180. Alternatively, the attributes defined by an SLO 102 may need to be modified. In the end, the frequency with which provisioning policies 304 are updated may depend on the rate of change in resource demands and may also depend on updates to SLOs 102 by users and business applications.

By using performance data for long-term capacity provisioning, the process 200 may be less manually intensive and, as a result, require less specific performance modeling and capacity planning efforts than prior art provisioning techniques. Moreover, because the process 200 is automated in real-time, provisioning policies 304 can be quickly updated based on feedback of how applications 114 perform against the attributes of the SLOs 102.

Further details related to the automated system and process are shown in FIG. 2B. As schematically shown by a graph, performance data 250 collected and stored in data repository (180) can include historical as well as real-time CPU utilization data for each of the various servers (112) of the computer system (100) and may have been collected for weeks or months from computer system (100). As discussed previously, recommendation tool (300) analyzes this performance data 250 and generates an operational profile. In embodiments discussed previously, the operational profile can characterize service levels in computer system (100) in a certain configuration and having a certain capacity, such as response times of servers when subjected to given workloads or the ability of severs to process given workloads or throughputs.

In the present embodiment, operational profile characterizes resource usage of computer system (100) over time so that it can be termed a resource usage profile, such as schematically shown by graph 260. This resource usage profile 260 captures workload-oriented information related to resource usage and history of computer system (100) that can be used in its capacity management. In this example, resource usage profile 260 encompasses a one-week interval (7 days× 24 hours) with data points for each hour so that the profile 260 has 168 data points. Alternatively, resource usage profile 260 can encompass one or more one-week intervals, two-week intervals, monthly intervals, particular business seasons, or any other desirable time periods.

Based on the operational profile 260, recommendation tool (300) automatically generates several current and scheduled provisioning policies (304). Details of how recommendation tool (300) automatically generates various provisioning policies (304) are discussed later. In general, the generated policies (304) can include a collection of rules for provisioning computer system (100), and recommendation tool 300 can use trending analysis, predictive analysis, what-if scenarios, and user input to generate the policy rules from the information in the operational profile 260. Moreover, the generated policies (304) can be based on time-dependent information, utilization levels, response times, transaction arrival rates, and other information. Once generated, provisioning tool (160) can automatically use the provisioning policies (304) to provision the system components (e.g., servers 112) of computer system (100).

In addition to straight automation, the automated provisioning system can include a user interface having a summary screen 270 to display generated provisioning policies 272 for user intervention and control. In the present example, each policy 272 can have a name, a start (date, time, etc.), and a recurrence interval (e.g., every number of days or months with or without a particular end date). Using summary screen 270, users can manually change, add, and delete the automatically generated provisioning policies 272 as desired.

In addition, an additional screen 275 can allow a user to set up dynamic rules for adjusting the load balancing associated with a given provisioning policy 272. As shown in this additional screen 275, a user can indicate a priority for a service (e.g., LoadGenerator) and can assign a range of servers to that service. Then, the user can assign dynamic rules to the service. As one example, an assigned dynamic rule may stop one server of the service if the CPU utilization falls below 30% for 15-min. or add one server to the service if the CPU utilization exceeds 60% for 20-min. Other types of rules discussed herein could also be assigned.

After generating provisioning policies 272, a controller or computing device 280 executing provisioning tool (160) implements provisioning policies 272 among partitioned servers 284 in the computer system's virtual environment 282 so that servers 284 can efficiently handle various SLOs. Controller 280, in turn, monitors results from implementing provisioning policies 272 by collecting additional performance data that is subsequently used to create a current resource usage profile 250. In this way, the entire process can be repeated to account for new loads, changes in resources, workloads, new Service Level Objectives, etc.

Figure 3:
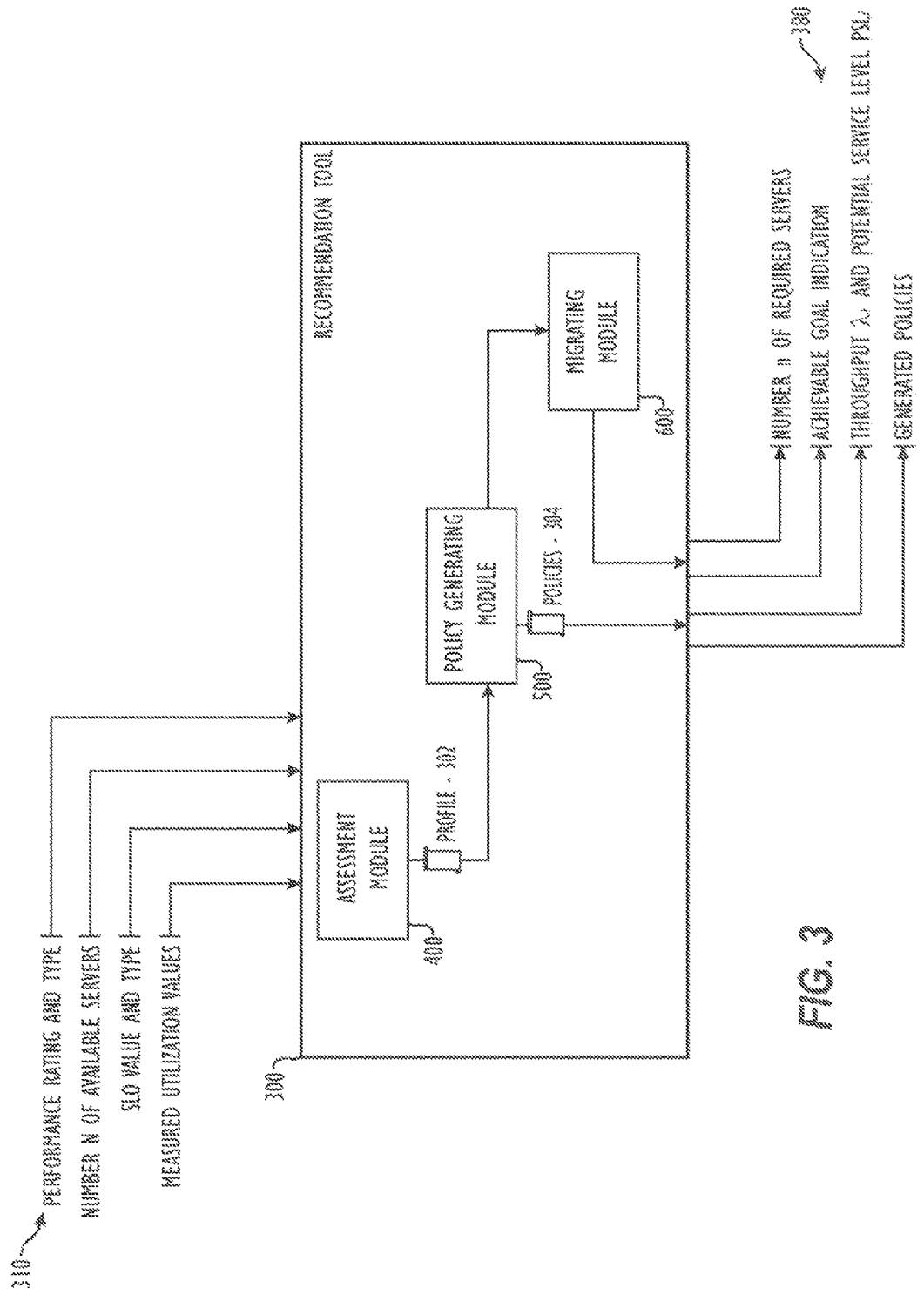
FIG. 3 illustrates a recommendation tool for the system of FIG. 1.

FIG. 3 illustrates additional features of recommendation tool 300, which will be discussed with reference to notations in Table 1 below.

TABLE 1

Notations Used to Describe Recommendation Tool and Other Components of the Present Disclosure

| Symbol | Definition |
| --- | --- |
| λ | total arrival rate of transactions or service requests to be distributed among servers |
| $\lambda_i$ | arrival rate to a given server i |
| $P_i$ | performance rating (a.k.a. processing power) of a given server i |
| $P_1$ | performance rating of a reference server, which is server 1, for example |
| $s_i$ | mean time a task is serviced at a given server i |
| $r_i$ | mean response time at a given server i |
| r | average response time of the system under consideration |
| $u_i$ | utilization of a given server i |
| n | number of required servers (from the available servers) |
| N | total number of available server in the virtual system |

As indicated, Table 1 includes notations for arrival rate and mean (average) response time at the server level (e.g., server i) and for the entire system. In a steady state environment for a non-saturated system, throughput essentially equals arrival. Based on the context, either the term "response time" or "service time" may be used. As used herein, response time can be defined for one or more of transactions, workloads, job, tasks, applications, threads, etc., and service time can also be defined for one or more of transactions, workloads, job, tasks, applications, threads, etc.

As shown in further detail in FIG. 3, recommendation tool 300 includes an assessment module 400, a policy generating module 500, and a migrating module 600. Briefly, assessment module 400 analyzes performance data collected by data collection tool (170) and generates a system resource usage profile 402, such as discussed previously. In turn, policy generating module 500 uses resource usage profile 402 and received SLO information to generate provisioning policies 304 discussed previously that provisioning tool (160) can then directly execute or look up to provision servers (112) of computer system (100). Independently, migrating module 600 also receives a copy of provisioning policies 304 and estimates a number of homogenous servers (112) needed to support the applications (114) currently running on heterogeneous servers (112) before migration.

Figure 4:
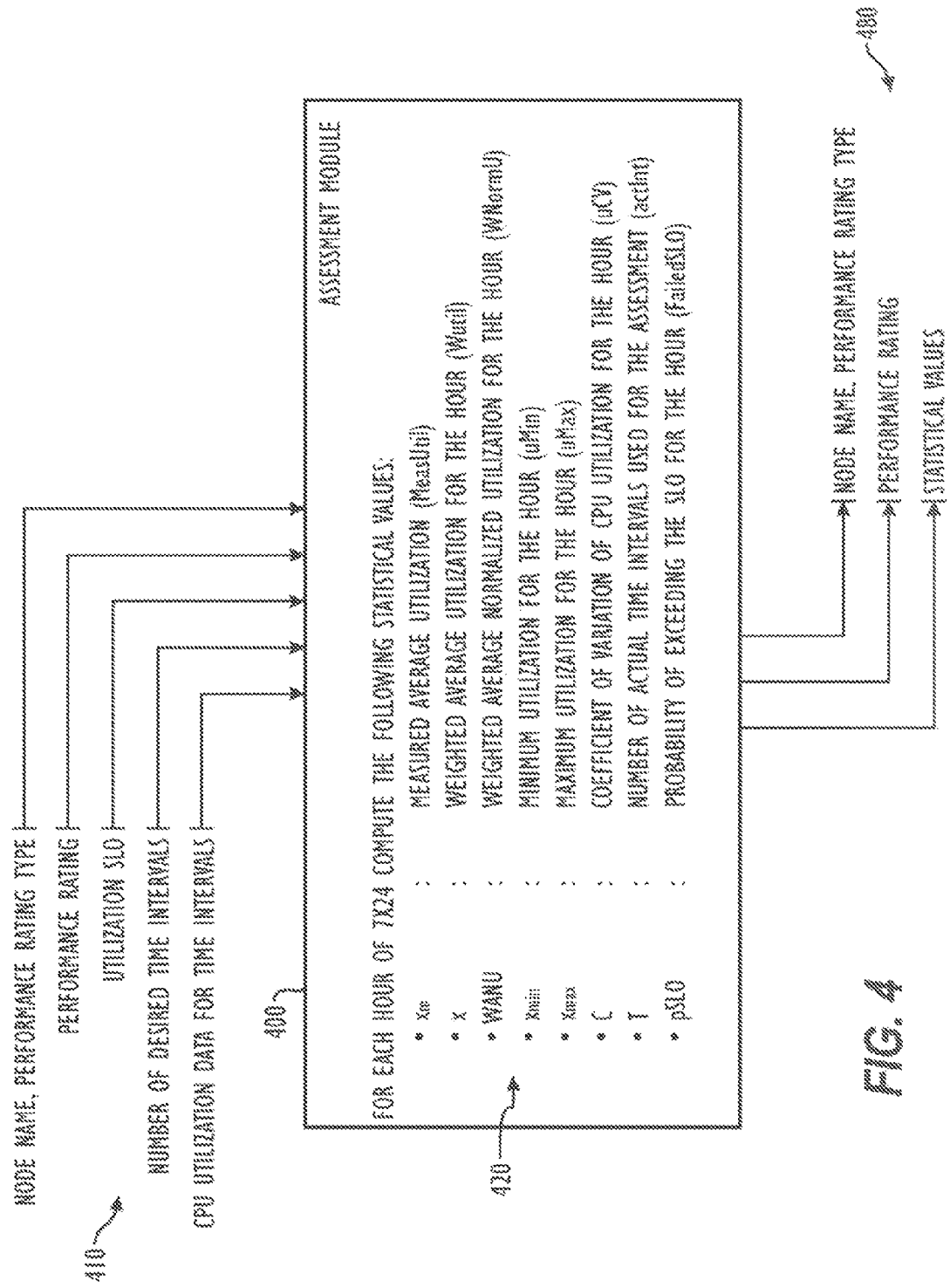
FIG. 4 illustrates an assessment module for the tool in FIG. 3.
Figure 5A:
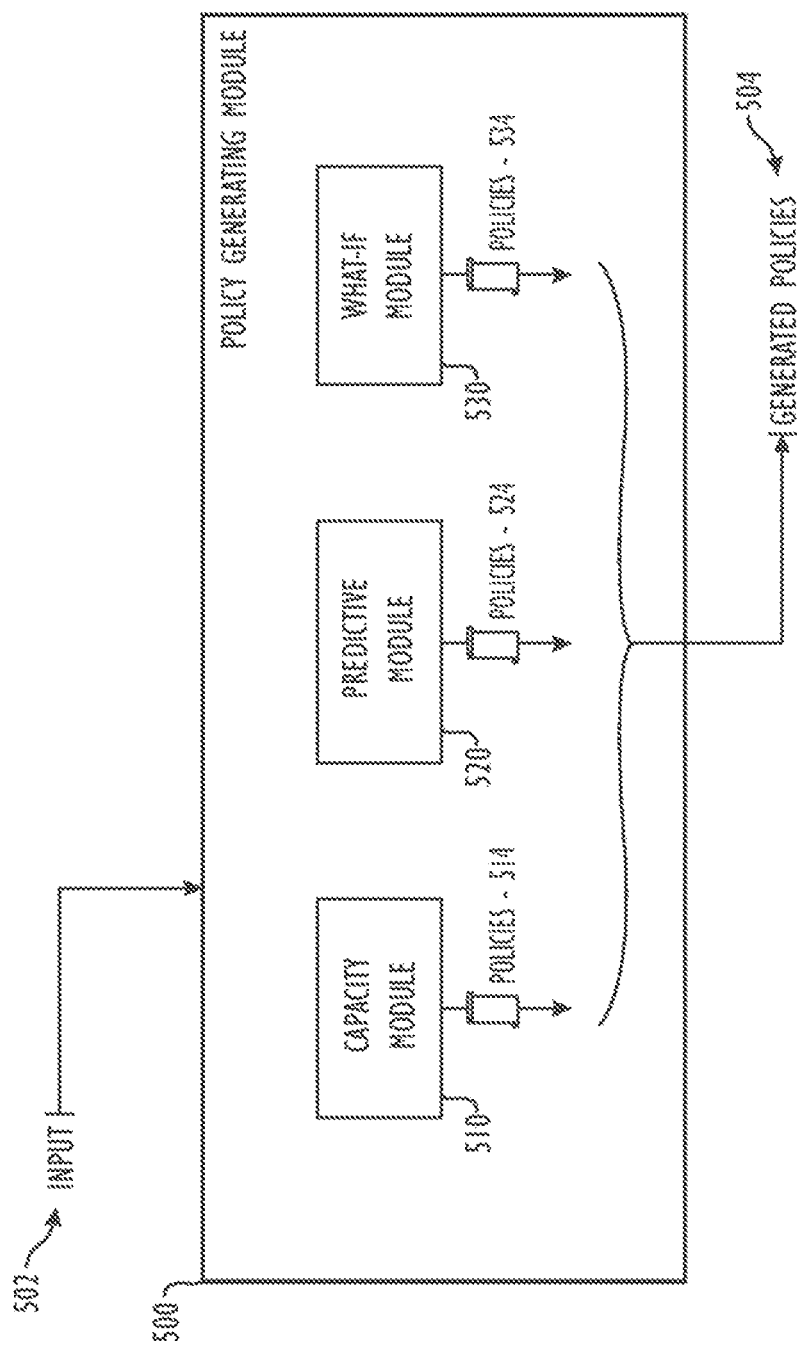
FIG. 5A illustrates a policy generating module for the tool in FIG. 3.
Figure 5B:
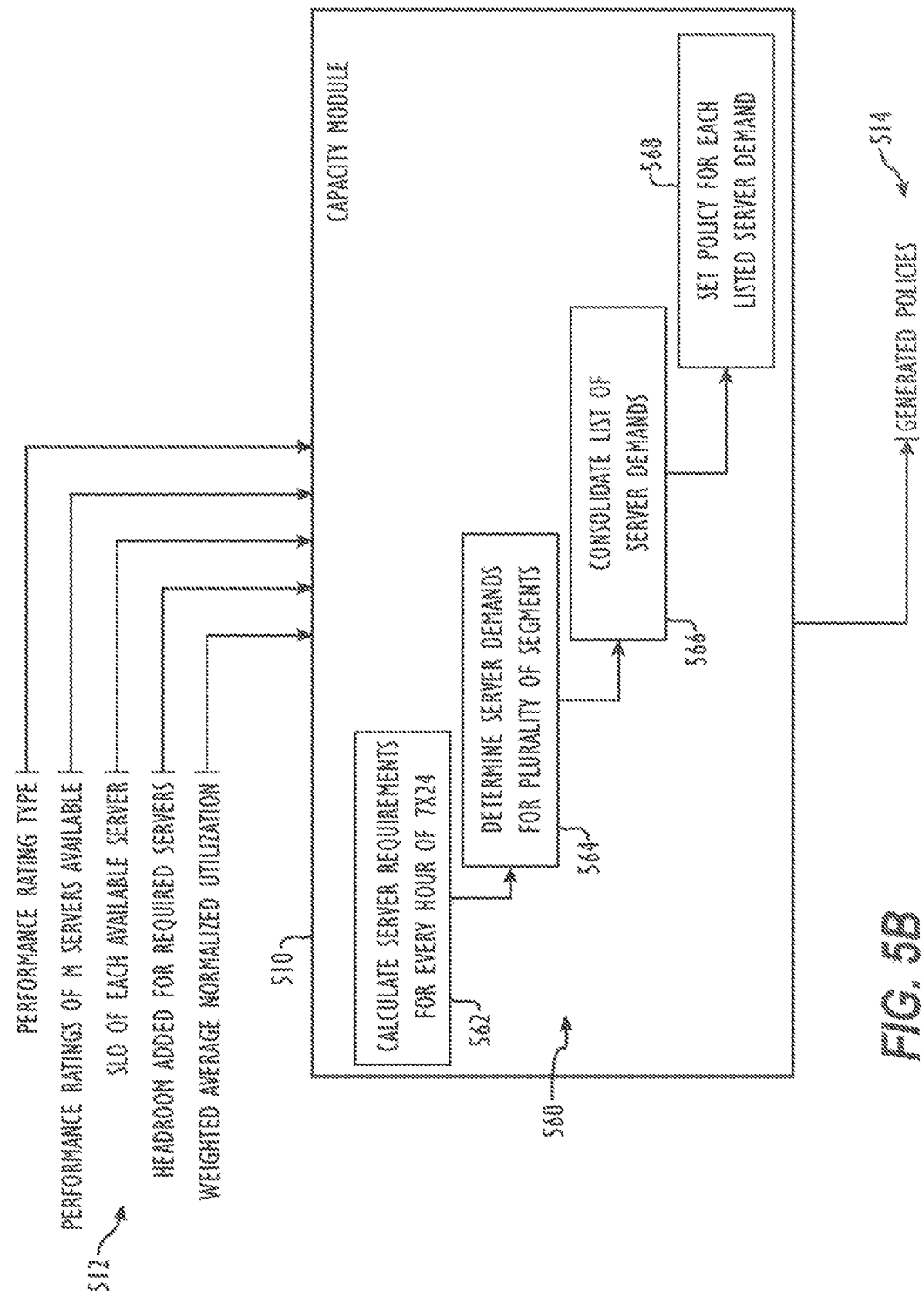
FIG. 5B illustrates a capacity module for policy generating module in FIG. 5A.
Figure 6:
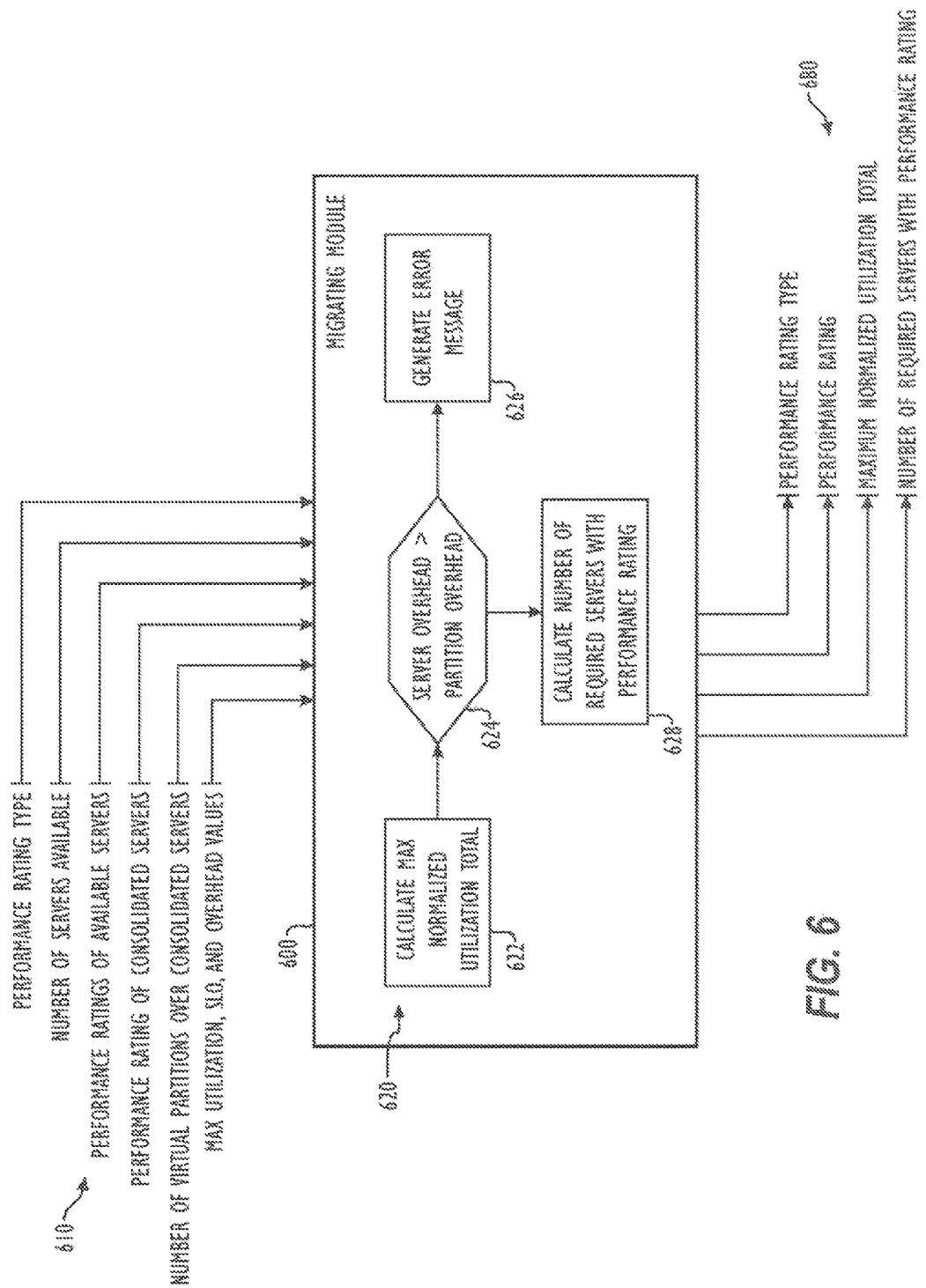
FIG. 6 illustrates a migrating module for the tool in FIG. 3.

Each of these modules 400, 500, and 600 are discussed individually in more detail with reference to FIGS. 4 through 6. Currently, however, discussion focuses on the overall operational details of recommendation tool 300.

During operation, recommendation tool 300 obtains input data 310 that includes the number N of available servers (112) of the computer system (100). For each available server i=1, 2, . . . , N, the input data 310 also includes the server's performance rating $P_i$ and the performance rating type, the server's SLO value ($SLO_i$) and the SLO type (e.g., utilization or mean response time), and the server's current measured utilization $U_i$. The performance rating $P_i$ can be characterized by any commonly used performance rating system.

Based upon the input data 310, recommendation tool 300 produces output data 380 that determines (a) the number n of servers (112) required to meet the SLOs (102), (b) the recommended arrival rate of transactions or service requests to each of the servers (112) used for load balancing, and (c) whether the overall service goal can be achieved (and provide a best possible solution if the service goal cannot be achieved). In general, output data 380 represents analytical information that provisioning tool (160) can use to perform "bounded scale-out" provisioning in the virtual environment of computer system (100). The solution is bounded or limited in the sense that the virtual environment actually has a maximum number of physical servers (N) of given processing power $$P = \sum_{i=1}^{n} P_i,$$

More particularly, output data 380 indicates how many servers (112) need to be active to drive a load balancer (162) of provisioning tool (160) to achieve the SLOs for applications (114) running in the virtual system.

As shown, in one embodiment, output data 380 includes a number n of required servers (i=1, 2, . . . , n) from available servers (112) and an indication whether the requisite processing goal can be achieved (e.g., where "0" means not achievable and "1" means achievable). For each required server (i=1, 2, . . . , n), the output data 380 also includes a recommended arrival rate $\lambda_i$ and a Potential Service Level ($PSL_i$) at the given server. The arrival rate, $\lambda_i$, defines the recommended rate of arrival of transactions or service requests to a given server. By definition, the arrival rate, $\lambda_i$, is greater than 0 and less or equal to 1 and is characterized by $$\sum_{i=1}^{n} \lambda_i = 1.$$

Calculations performed by recommendation tool 300 can be based on various statistical assumptions. Using assumptions associated with an M/M/1 type queuing system, recommendation tool 300 can use the following set of computations to generate the illustrative output data 380. For a given server processing power, $P_i$ (i=1, 2, . . . , n) the optimal arrival rate of transactions made to a given server i can be defined by:

$$\lambda_i = \frac{P_i}{s_1 P_1} - \frac{\left(\frac{P}{s_1 P_1} - \lambda\right)\sqrt{P_i}}{\sum_{j=1}^{n} \sqrt{P_j}}, \text{ provided that } P > s_1 P_1 \lambda. \quad (1)$$

If the load is heavy, i.e., the total arrival rate to be distributed among servers $\lambda \rightarrow P/(s_1 P_1)$, then the arrival rate to each server (112) should approach the service rate of the server:

$$\lambda_i \rightarrow \frac{P_i}{s_1 P_1}.$$

Under this transaction distribution, each server 112's utilization can be characterized as:

$$u_i = \lambda_i \frac{s_1 P_1}{P_i} \quad (2)$$

If the SLO type is a utilization value, then recommendation tool 300 tries to find a solution such that the utilization of a given server is less than or equal to the value of its SLO (i.e., $u_i \leq SLO_i$) for all active n servers. If the SLO type is a mean response time, recommendation tool 300 tries to find a solution such that the mean response time at a given server is less than or equal to the value of its SLO (i.e., $r_i \leq SLO_i$) for all active a servers. Consequently, the mean response time r at server i can be computed as:

$$r_i = \frac{s_1 P_1}{P_i(1 - u_i)} \quad (3)$$

In this case, the average response time r to the virtual system is characterized as:

$$r = \frac{1}{\lambda}\left[\frac{\left(\sum_{k=1}^{n}\sqrt{P_k}\right)^2}{P - \lambda s_1 P_1} - n\right] \quad (4)$$

If not all the SLOs can be achieved, then recommendation tool 300 will provide the best possible load balancing to distribute transactions based on the various recommended arrival rates $\lambda_i$ of the available servers (l=1, 2, ..., N).

FIG. 4 shows features of recommendation tool's assessment module 400. As noted previously, assessment module 400 analyzes performance data and generates an operational profile, such as a resource usage profile discussed previously. To do this, assessment module 400 receives input 410, performs calculations on the input 410 with a statistical analysis algorithm 420, and provides output 480 to be used for later processing by policy generating module 500. In its operation, assessment module 400 analyzes one node of computer system (100) (e.g., one server 112) at a time and can handle information for multiple nodes at a time through multiple calls. Alternatively, assessment module 400 can be designed to handle simultaneous analysis for multiple nodes of computer system (100).

For a given node (i.e., server) and in one embodiment, the input 410 includes Node Name, Performance Rating Type, performance rating (i.e., processing power) (P), utilization service level objective (SLO), number of desired time intervals to be assessed (T'), and CPU utilization data for T' intervals $x_1, x_2, \ldots, x_{T'}$.

For each interval of the time period (e.g., each hour of the 7×24 period), statistical analysis algorithm 420 computes the following statistical values: a measured average utilization ($\bar{x}_m$), a weighted average utilization for the hour ($\bar{x}$), a weighted average normalized utilization for the hour (WANU), a minimum utilization for the hour ($x_{min}$), a maximum utilization for the hour ($x_{max}$), a coefficient of variation of CPU utilization for the hour (C), and a probability of exceeding the SLO for the hour ($p_{SLO}$). These statistical values over the current time period of interest forms the resource usage profile discussed previously that is used to generate provisioning policies.

Details of the calculations performed by assessment module 400 are as follows. For the T data points in the current time period, assessment module 400 computes a weighted average for the data points that places more emphasis on more recent data. To do this, it is assumed that the importance of a particular interval is an importance factor α times more important than the previous interval so that weights $w_i$ for the T data points are assigned in the following fashion:

$$w_t = \frac{\alpha^{t-1}(\alpha - 1)}{\alpha^T - 1}, \text{ for } t = 1, 2, \ldots, T \quad (5)$$

In addition to the weights $w_i$, the assessment module 400 computes the measured average utilization ($\bar{x}_m$) for the T data points, $x_1, x_2, \ldots, x_T$, as follows:

$$\bar{x}_m = \frac{1}{T}\sum_{t=1}^{T} x_i \quad (6)$$

Using the measured average utilization ($\bar{x}_m$) and the weights $w_i$, assessment module 400 computes the weighted average utilization for the hour ($\bar{x}$) as follows:

$$\bar{x} = \sum_{t=1}^{T} w_t x_i \quad (7)$$

From this, the weighted average normalized utilization for the hour (WANU) is calculated as follows:

$$\text{WANU} = P\bar{x} \quad (8)$$

As a corollary, the minimum utilization for the hour ($x_{min}$) is calculated as follows:

$$x_{min} = \min(x_1, x_2, \ldots, x_T) \quad (9)$$

As well, the maximum utilization for the hour ($x_{max}$) is calculated as follows:

$$x_{max} = \max(x_1, x_2, \ldots, x_T) \quad (10)$$

The coefficient of variation of CPU utilization for the hour (C) is calculated as follows:

$$\sigma = \sqrt{\frac{1}{N}\left(\sum_{i=1}^{T} x_i^2\right)^2 - \bar{x}^2} \quad (11)$$

$$C = \sigma/\bar{x}, e \leftarrow 0 \quad (12)$$

The probability of exceeding the SLO for the hour ($p_{SLO}$) is calculated as follows:
For each $x_i$, i=1, 2, ..., T, if $x_i > SLO$, $e \leftarrow e+1$; (13)

$$P_{SLO} = e/T \quad (14)$$

After statistical analysis algorithm 420 computes the above statistical values, assessment module 400 generates output data 480 for each server that includes the node name (e.g., server), performance rating type, performance rating (P), and the above computed statistical values representing the resource usage profile of computer system (100). This output data 480 is then made available to policy generating module (500) as described below.

In FIG. 5A, illustrative policy generating module 500 includes a capacity module 510, a predictive module 520, and a what-if module 530, although other implementations may have only one such module or any combination thereof. Policy generating module 500 receives input 502 and generates one or more policies 504 for provisioning computer system. As mentioned previously, the policies 504 can be characterized as a collection of rules to be looked up by provisioning tool (160) when making provisioning decisions or can be characterized as provisioning decisions or commands sent to provisioning tool (160) to act on directly.

Capacity module 510 receives attributes defined in SLOs, server information, and historical information pertaining to resource utilization (e.g., the resource usage profile from assessment module) as its input 502. Using analysis described in more detail with reference to FIG. 5B, capacity module 510 then generates policies 514 to match resources to the application demand "just-in-time".

As detailed below, predictive module 520 and what-if module 530 generate policies based on a combination of information pertaining to resources, workloads, service levels, and time. For example, the time information can be any given time interval, the workload information can be an average arrival rate of x transactions or jobs, the resource information can be the number of allocated servers, and the service level information can be average response times or throughput. What-if module 530 can further produce different combinations of workloads and resources to determine what the resulting performance would be in each of the different combinations and whether the system will be saturated or not.

Illustrative predictive module 520 receives various types of information as its input 502 such as an operational profile characterizing server utilization, actual workloads, actual service levels, and time-related information. Predictive module 520 applies historical trending and predictive analysis to the input information and generates policies 524 that can then match current/past application performance based on predicted resource requirements. Therefore, predictive module 520 can use a form of curve matching analysis based on forecasted demand (i.e., expected workload). In other words, predictive module 520 can predict that at a given time a given number of x more servers may be needed, where this prediction is partly based on what workload the system may be required to handle at that time or based on the expected utilization at the time.

In one example, information about server utilization can be provided by the operational profile from assessment module, and module 520 can generate a policy 524 indicating that high utilization levels will drive allocation of more servers based on analysis of server utilization information. In another example, information about actual workloads can characterize what an application is attempting to do and can indicate, for example, transaction throughput (e.g., how many transactions arrived each second or minute) or job throughput (e.g., how many batch jobs were submitted per day). Based on an analysis of such workload information, module 520 can generate a policy 524 indicating that high workload requests will drive resource allocation before servers are utilized or before service levels deteriorate. In general, high workload requests are the same as a high workload arrival rate, which is the throughput in a steady state, non-saturated system.

In yet another example, information about actual service levels can indicate what was the response time for the transactions, how long it took to process batch jobs, what was the throughput, was the system able to execute all the workload, etc. In addition, service level agreements and objectives (SLAs and SLOs) can define such information as response time, throughput, and utilization. Based on an analysis of such service level information, module 520 can generate a policy 524 indicating that certain levels of near-poor service will drive certain resource allocation. Finally, the time-related information can indicate when the information pertaining to server utilization, workload, and service level occurred. Based on an analysis of this time-related information, module 520 can generate a policy 524 indicating that resources will be pre-allocated at certain times.

What-if module 530 receives information as its input 502 similar to that received by predictive module 520, and what-if module 530 applies historical trending and predictive analysis to that information. However, what-if module 530 further applies what-if scenarios in its analysis to generate policies. In this way, what-if module 530 can allow users to vary input of demand to produce what-if scenarios so the module 530 can then generate policies 534 that match resource requirements to the demand input by the user.

In one example, what-if module 530 accepts as user input a list of workldoad scenarios and desired service levels. The input may indicate, for example, that a response time of 1 second is expected at 100 transactions per second and that a response time of 2 seconds is expected at 1000 transactions per second. After analyzing the characteristics of the application, what-if module 530 runs a series of what-if scenarios to discover the desired amount of resources. In other words, in a scenario for 100 transactions per second, the module 530 may predict what would be the response time if 2 servers, 4 servers, 8 servers, 10 servers, and 20 servers were used.

After analysis, what-if module 530 then determines the smallest number of servers required to meet the desired service objective at the given workload level. In turn, this determined information is used to generate a policy 534 that can state a predicate, such as "if transaction rate is 100 transactions per second for application having stated characteristics is encountered, then provision x servers with y processing power." Even if these conditions are not met, the generated policy 534 is still created to handle such an eventuality in a particular business scenario. If and when the eventuality does occur in the future, then the provisioning tool can implement the generated policy 534, and there would be no need to first experience and then detect poor performance.

As shown in FIG. 5B, illustrative capacity module 510 receives input data 552, performs operations of the provisioning algorithm 560, and generates output data 554 to be used to provision the servers (112) of the computer system (100). In the illustrated embodiment, the input data 552 includes a performance rating type, performance ratings of m servers available for provisioning ($P_1, P_2, \ldots, P_m$), service level objectives of each of the m servers ($SLO_1, SLO_2, \ldots, SLO_m$), and a headroom value added for the required servers (H). In addition, input data 552 includes weighted average normalized unitization values (WANU(i,j)) from assessment module (400; FIG. 4) for each hour i of the time period (e.g., 7×24) and for each server j. This information essentially corresponds to the current historical performance data in the resource usage profile of the computer system (100).

Using the input data 552, capacity module 510 begins operations of provisioning algorithm 560 by calculating server requirements for every hour of the 7×24 time period (Block 562). For example, for each hour i of the 7×24 time period, capacity module 510 calculates a weighted average normalized unitization total (WANUT) using the weighted average normalized unitization values (WANU(i,j)) as follows:

$$WANUT(i) = \sum_{j=1}^{m} WANU(i, j) \equiv A[0] \tag{15}$$

From this total, capacity module 510 determines the number of servers needed for a given hour (m'(i)) as follows $$A[m'(i)] \equiv WANUT(i) - \sum_{k=1}^{m'(i)} SLO_k P_k - H \le 0, \tag{16}$$

where H is the headroom added for the required servers. In the above calculation, A[m'(i)−1]>0. If desirable, the headroom value H can also be particularized as H(k) to include system overhead for a given server k.

With the above calculations, illustrative capacity module 510 calculates a list of 168 numbers, denoted as m'(1), m'(2), ..., m'(168). This list represents server requirements for every hour of the 7×24 time period (i.e., 168 data points). Preferably, capacity module 510 determines server demands based a "sensitivity" variable and divides the list of server demands into a plurality of segments so that the sensitivity variable can control how frequently policies should be updated to reflect the demands on servers (Block 564). Moreover, capacity module 510 preferably consolidates the list of server demands by combining together those adjacent segments having identical server demands (Block 566). In other words, capacity module 510 does not need to set a policy for every segment if two adjacent segments have the same server demand. In such a case, the later identical demand could be removed from the list, and such consolidation can continue until capacity module 510 obtains a list without identical adjacent server demands.

After obtaining the consolidated list of server demands, capacity module 510 sets policies for each listed server demand (Block 568). To do this, capacity module 510 computes transaction weights $w_k$ to supply to load balancer (162; FIG. 1) of provisioning tool (160) to control the arrival rate of transactions to the servers (112). Based on the processing power $P_k$ of a given server k, the SLO for that server $SLO_k$, and the total server requirements, the transaction weight $w_k$ for a given server k is calculated as follows:

$$w_k = \frac{P_k SLO_k}{\sum_{i=1}^{m} P_i SLO_i} \quad (17)$$

The transaction weights we are generated as output data 554 of one or more server provisioning policies that specify the number of servers needed at hour h. Based on the provisioning policies, provisioning tool's load balancer (162) then distributes arriving transactions to a given server k using the calculated transaction weight $w_k$ for that given server.

FIG. 6 shows features of migrating module 600 in FIG. 3. As noted previously, migrating module 600 determines how to migrate operation of servers (112) between partitions of the computer system (100) by estimating the number of homogeneous servers (112) needed to support applications (114) currently running on heterogeneous servers (112) before migration. Illustrative migrating module 600 receives input data 610 including a performance rating type, a total number of available servers to be consolidated or migrated (N), and performance ratings of the N available servers to be migrated ($P_1, P_2, \ldots, P_N$).

In addition to information on available servers, the input data 610 includes information on currently consolidated servers, including a performance rating (P) of the consolidated servers, a number of virtual partitions (Vn) over the consolidated servers, a utilization Service Level Objective (SLO) of the consolidated servers, a utilization overhead (H) introduced for each required server with a performance rating, and a utilization overhead (h) introduced for each virtual partition. Moreover, input data 610 includes information from assessment module (400; FIG. 4), including a maximum utilization U(i,j) for each hour i of the 7×24 time period and each available server j.

Using input data 610, migrating module 600 performs a migrating algorithm 620 to determine how to migrate or consolidate available servers. First, migrating algorithm 620 calculates a maximum normalized unitization total (MNUT) for all of the available servers N over the 7×24 time period (Block 622). The calculation is as follows:

$$MNUT = \max_{i=1}^{168} \sum_{j=1}^{N} P_j U(i,j) \quad (18)$$

Migrating module 600 then determines whether the server overhead is grater than the partition overhead by determining if H+h×Vn>SLO (Decision 624). If there is too much overhead, migrating module 600 sends out an error message, such as "The overheads are greater than the utilization SLO" (Block 626). If there is not too much overhead, migrating module 600 determines the number (n) of required servers with performance rating P (Block 628) using the calculation:

$$n = \left\lceil \frac{MNUT}{P \times (SLO - H - h \times Vn)} \right\rceil \quad (19)$$

Migrating module 600 produces output data 680 that includes the performance rating type, the performance rating (P), the maximum normalized utilization total (MNUT), and the number (n) of required servers with performance rating P. This output 680 can then be used by the provisioning tool (160) to migrate the various servers (112) among the virtual partitions.

The foregoing description of preferred and other embodiments is not intended to limit or restrict the scope or applicability of the inventive concepts conceived of by the Applicants. For example, the various modules disclosed herein can comprise one or more software tools executable on one or more independent computing devices operatively coupled to the computer system. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A system for automated capacity provisioning, the system comprising:
    an assessment module configured to cause at least one processor to analyze performance data of a computer system to implement an application with fluctuating demand, and generate a system resource usage profile based on the performance data, the system resource usage profile characterizing resource usage of computer resources of the computer system over time;
    a policy generating module configured to cause the at least one processor to automatically generate one or more provisioning policies based on an analysis of the system resource usage profile and one or more service level agreements (SLAs), the policy generating module configured to cause the at least one processor to calculate a number of servers required for each of a plurality of time slots, to merge adjacent time slots having same calculated number of servers, and to calculate transactional weights to control arrival rate of transactions to the servers for one or more of the time slots; and
    a load balancer configured to cause the at least one processor to scale the computer resources based on the one or more provisioning polices including adjusting an allocation of servers to the number of servers required for a particular time slot of the plurality of time slots, wherein the load balancer is configured to cause the at least one processor to distribute arriving transactions to the servers using the calculated transactional weights.

2. The system of claim 1, wherein the policy generating module includes a predictive module configured to cause the at least one processor to apply historical trending and predictive analysis to predict the number of servers at a given time.

3. The system of claim 1, wherein the policy generating module includes a what-if module configured to cause the at least one processor to generate what-if scenarios to produce different combinations of workloads and resources to determine resulting performance in each of the combinations.

4. The system of claim 3, wherein the what-if module is configured to cause the at least one processor to determine a smallest number of servers required to meet a corresponding SLA at a given workload level.

5. The system of claim 1, further comprising:
a migrating module configured to cause the at least one processor to generate one or more provisioning policies to consolidate available servers between partitions of the computer system by estimating a number of homogeneous servers needed to support the application before migration.

6. The system of claim 5, wherein the migrating module is configured to cause the at least one processor to calculate a maximum normalized unitization total for all available servers over a time period, and determine whether a server overhead is greater than a partition overhead, and if the server overhead is not greater than the partition overhead, the migrating module is configured to cause the at least one processor to calculate a number of required servers.

7. The system of claim 1, wherein the policy generating module is configured to cause the at least one processor to receive an updated system resource usage profile, and automatically modify the one or more provisional policies based on a subsequent analysis of the updated system resource usage profile in conjunction with the one or more SLAs.

8. The system of claim 1, wherein the policy generating module is configured to cause the at least one processor to provide a user interface configured to allow a user to set up dynamic rules for adjusting the scaling of the computer resources.

9. A non-transitory computer-readable medium storing instructions, when executed by at least one processor, are configured to perform the following operations:
analyze performance data of a computer system to implement an application with fluctuating demand;
generate a system resource usage profile based on the performance data, the system resource usage profile characterizing resource usage of computer resources of the computer system over time;
automatically generate one or more provisioning policies based on an analysis of the system resource usage profile and one or more service level agreements (SLAs) including calculate a number of servers required for each of a plurality of time slots, merge adjacent time slots having same calculated number of servers, and calculate transactional weights to control arrival rate of transactions to the servers for one or more of the time slots; and
scale the computer resources based on the one or more provisioning polices including adjust an allocation of servers to the number of servers required for a particular time slot of the plurality of time slots and distribute arriving transactions to the servers using the calculated transactional weights.

10. The non-transitory computer-readable medium of claim 9, wherein the automatically generate one or more provisioning policies further includes generate what-if scenarios to produce different combinations of workloads and resources to determine resulting performance in each of the combinations.

11. The non-transitory computer-readable medium of claim 9, wherein the automatically generate one or more provisioning policies further includes generate one or more provisioning policies to consolidate available servers between partitions of the computer system by estimating a number of homogeneous servers needed to support the application before migration.

12. The non-transitory computer-readable medium of claim 9, further comprising:
receive an updated system resource usage profile; and
automatically modify the one or more provisional policies based on a subsequent analysis of the updated system resource usage profile in conjunction with the one or more SLAs.

13. A method for automatically allocating resources in a computer system, the method comprising:
analyzing performance data of a computer system to implement an application with fluctuating demand;
generating a system resource usage profile based on the performance data, the system resource usage profile characterizing resource usage of computer resources of the computer system over time;
automatically generating one or more provisioning policies based on an analysis of the system resource usage profile and one or more service level agreements (SLAs) including calculating a number of servers required for each of a plurality of time slots, merging adjacent time slots having same number of servers, and calculating transactional weights to control arrival rate of transactions to the servers for one or more of the time slots; and
scaling the computer resources based on the one or more provisioning polices including adjusting an allocation of servers to the number of servers required for a particular time slot of the plurality of time slots and distributing arriving transactions to the servers using the calculated transactional weights.

14. The method of claim 13, further comprising:
applying historical trending and predictive analysis to predict the number of servers at a given time.

15. The method of claim 13, further comprising:
generating what-if scenarios to produce different combinations of workloads and resources to determine resulting performance in each of the combinations; and
determining a smallest number of servers required to meet a corresponding SLA at a given workload level.

* * * * *